US006133914A

United States Patent [19]

Rogers et al.

[11] Patent Number: 6,133,914

[45] Date of Patent: Oct. 17, 2000

[54] INTERACTIVE GRAPHICAL USER INTERFACE

[76] Inventors: David W. Rogers, 6101 Imperata St. NE. Apt. 2013; David M. Vick, 3401 la Salle del Oesco NE., both of Albuquerque, N. Mex. 87111

[21] Appl. No.: 09/003,620

[22] Filed: Jan. 7, 1998

[51] Int. Cl.[7] ........................ G06F 3/00

[52] U.S. Cl. .................. 345/334; 345/342; 345/473; 345/439

[58] Field of Search .................. 345/339, 333, 345/332, 326, 334, 340, 342, 335, 349, 348, 439, 473

[56] References Cited

U.S. PATENT DOCUMENTS

| | | | |
|---|---|---|---|
| 4,823,303 | 4/1989 | Terasawa | 345/342 |
| 5,341,466 | 8/1994 | Perlin et al. . | |
| 5,561,757 | 10/1996 | Southgate . | |
| 5,604,516 | 2/1997 | Herrod et al. . | |
| 5,675,753 | 10/1997 | Hansen et al. | 345/333 |
| 5,692,143 | 11/1997 | Johnson et al. | 345/339 |
| 5,796,401 | 8/1998 | Winer | 345/433 |
| 5,825,359 | 10/1998 | Derby et al. | 345/344 |
| 5,872,567 | 2/1999 | Amro | 345/342 |
| 5,874,965 | 2/1999 | Takai et al. | 345/357 |
| 5,889,517 | 3/1999 | Ueda et al. | 345/339 |

FOREIGN PATENT DOCUMENTS

WO98/20436 5/1998 WIPO .

OTHER PUBLICATIONS

Bederson, Benjamin B.; et al.: "A Zooming Web Browser"; IS&T/SPIE Electronic Imaging Science and Technology Symposium, San Diego, California (Jan. 30, 1996).

Langberg, Mike; "The Brain' puts some thought into filing"; San Jose Mercury News (Computing + Personal Tech), San Jose, California (Mar. 8, 1998).

*Primary Examiner*—John E. Breene
*Assistant Examiner*—Tadesse Hailu
*Attorney, Agent, or Firm*—Larry B. Guernsey

[57] ABSTRACT

A method and apparatus for interfacing graphically with a user of a computer system having selecting means, and display means, which identifies a relationship structure between physical objects and activities external to the computer system which are related to the information to be manipulated in the computer system. At least one data structure is created which corresponds to the identified relationship structure. A plurality of on-screen objects which correspond to information identified in the physical objects and activities external to the computer system is displayed on the display means. A user selection is detected among the displayed on-screen objects, where each on-screen object has initial size and position states. Intermediate and final size and positions states for each on-screen object are prepared according to the data structures. The on-screen objects in their intermediate size and position states are animated on the display means, until finally the on-screen objects in their final size and position states are displayed according to the data structure.

Also disclosed is a system for interfacing graphically with a user.

7 Claims, 10 Drawing Sheets

100 Interactive display routine
102 Enter data tree information
104 Enter sizing and layout information
105 Wait for selection
106 User clicks with selection device
108 Within window? No / Yes
112 Currently selected window? Yes / No
116 Within a control? Yes / No
114 Select a window
118 Access control
120 Redraw control
Send external message
200 Calculate final size of objects
300 Calculate final position of objects
400 Animate intermediate frames
500 Render final positions

INTERACTIVE GRAPHICAL USER INTERFACE

TECHNICAL FIELD

The present invention relates generally to a method and apparatus for displaying information to users of computer systems. More particularly, the present invention relates to a new computer user interface which interacts dynamically to control size and arrangement of both information and control objects in response to user input and to solve the navigation problems associated with such information.

BACKGROUND ART

As the world becomes more complex, our lives ire impacted by many factors which occur on many different scales of magnitude, from the international to the national and the local. From these different scales of information, each user will find certain information useful and other information meaningless. The status of these kinds of information will change over time. The focus of interest will be variable, but although the focus may shift, it is still important to see the factors surrounding and contributing to the focus of interest. Thus, seeing connections between information is often more useful than viewing isolated pieces of information. Context becomes important. A system of organizing data will be more effective if it can display all levels from the global to the local, while still providing the user with a sense of relationship between the different scales.

In modern computer based systems, the organization of data is primarily handled through the use of a graphical user interface. A typical graphical user interface may be a windows-based system for interfacing with a programmed computer by means of graphical display windows. Over the past few decades, a variety of graphical user interfaces have been developed to ease human interaction with computer systems. Many user interfaces utilize metaphors in the design of the interface as a way of maximizing human familiarity and conveying information between the user and the computer. Through the use of familiar metaphors, such as desk tops, notebooks and the like, the interface takes advantage of existing human mental structures by drawing upon the metaphor analogy to lead to an understanding of the requirements of the particular computer system.

In current generation systems, it is common for computer systems to incorporate so-called "object-oriented" display systems which utilize multiple "windows" on a display in which combinations of text and graphics are shown.

Using a desk top metaphor, the windows may take the form of a variety of objects, such as file folders, loose leaf binders, or simple rectangles, and the windows may overlap one another with the top window being the active one. Following the metaphor, the windows simulate sheets of paper which obscure each other when stacked in the same manner as physical sheets may do on a physical desk of limited size. Also true to the metaphor, it is possible to lose a sheet or folder which is out of sight in a stack in much the same way as a physical sheet may be misplaced on a disordered desk top. Thus the advantage of familiarity which the metaphor engenders is also accompanied by the disadvantages found in this same physical metaphor.

In a typical window-based Graphical User Interface ("GUI"), files and display objects are represented by visual symbols, commonly referred to as "icons". These icons are designed to provide a generic representation of the file contents, usually together with a title. Thus all word processing documents done with a common application will have a generic icon identifying them as a kind of document, accompanied by a title which is meant to be descriptive of its contents for easy recognition. Similarly, graphic files whose contents are pictorial are themselves usually represented by a generic icon which identifies them as a type of file, again, with a hopefully descriptive title for recognition purposes. Naturally, this title will never provide recognition of the file's contents as immediately as the picture contained in the file. Especially in applications where graphic files are manipulated by cropping, enhancing, etc., formulating descriptive titles for variations which will be recognizable later can be challenging. Some commercially available software programs such as HiJaak™ have been designed to correct this problem by producing "thumbnails" which replace generic icons. These can enhance recognition by converting the generic icons to icon-sized depictions of the graphic file contents but these are generally limited in size. Typically, there is no included mechanism for closer inspection which may be necessary to distinguish between files which have been modified but appear from a distance to be identical.

In the prior art, the organization of icons and the information they represent usually is accomplished without conveying a sense of the context in which that particular information exists. Files relating to a common subject may be grouped together in a directory, but this relationship is usually only observable by exiting the file and viewing its position with a file manager program such as Windows Explorer™. A user can easily lose any sense of context when dealing with such a GUI. Additionally, when a document or file is selected, there is no easily visible dynamic re-ordering of related files by which a user may track his position in an information environment with multiple scales of information. As an example, a manager of a factory may wish to control the speed of a production line while following the price of raw materials on the world market. The prior art does not allow the reception and manipulation of information on such multiple scales, and provides no sense of the relationship between these levels of data.

Prior art inventions have tried various means to deal with the tendency of materials to be obscured or lost by overlapping windows in a graphic user interface which uses the desktop metaphor. U.S. Pat. No. 5,561,757 to Southgate discloses two separate window areas. One area may be designated as an overlap area where the windows are allowed to overlap and at least partially obscure each other. A second area allows windows to be displayed in a tiled format, where there is no overlap. This invention alleviates some of the tendency to lose files due to having them buried in a stack, but for large numbers of files, the tiled representations will be so small that locating a desired file may still be difficult. Additionally, this configuration of files gives no sense of how the files are related to each other.

U.S. Pat. No. 5,341,466 to Perlin shows a fractal computer interface with zooming capability. A variety of documents can be viewed as if spread out upon the metaphorical desktop as seen from a distance. By selecting an area and zooming in, the viewer appears to approach the area which contains the chosen document. Other surrounding documents appear to move off the edges of the screen as the field of view approaches the area of the selected document. This is analogous to viewing a desktop through a picture frame held at arm's length, and advancing toward the desktop as the field of view zooms in. Non-selected items at the periphery of the field of view are enlarged at the same rate as the chosen item of interest. There is no dynamic interaction and ordering of non-selected materials in response to the selection, thus the sense of relationship is easily lost. Moreover, in order to re-establish this sense of relationship, the field of view must be zoomed out again, at which point the documents may become too small to identify, or even disappear from view altogether.

SELF is a large information space which has been the object of a research effort by Sun Microsystems, and is concerned with a different metaphor for interacting with computers. On a computer, the SELF window is a large surface upon which the user navigates by looking at a thumbnail sketch of the overall space. The user can pan the field of view within the space, but objects do not resize or arrange themselves dynamically during user interaction.

Pad++ is a user interface in which the user can navigate by zooming. Users can zoom into an image and find more information behind that image. However, users can move past information without noticing and lose track of it, and this can lead to the same sort of disorientation that some people experience in Virtual Reality environments.

Thus, there is a need for a graphic user interface which interacts dynamically with the viewer to allow easy viewing of the item of interest, while still making visible the relationship of the non-selected items. Additionally, there is a need for a system for organizing data which can display all levels of information from the global to the local, while still providing the user with a sense of relationship between the different scales. Such an interface would maintain the context of the surrounding information or controls and make navigating, finding, and using such objects simple and easy.

DISCLOSURE OF THE INVENTION

Accordingly, it is an object of the present invention to provide a computer environment which allows easier user access and manipulation of controls and information.

Another object of the present invention is to provide a computer interface which promotes interaction with large data and control structures, and which provides designers the opportunity of presenting these structures in new ways.

It is another object of the present invention to provide a computer environment that interacts dynamically with the user.

It is still another object of the present invention to provide a computer environment in which locating controls and information is more easily achieved.

Another object of the present invention is to provide a computer environment that allows easy multiscalar interaction with information objects so that both large organizations and small data can be viewed together.

It is a further object of the present invention to provide a computer environment that reacts to user and system input to arrange information and control objects in a manner most useful to the user.

Yet another object of the present invention is to present files in an organized manner such that there is no distinction between local and remote information.

A yet further object of the present invention is to provide a 2.5 D computer environment in which nothing is ever behind anything else, so that nothing can ever be lost.

It is still another object of the present invention to provide a computer environment in which the user can navigate by means of a "flying zoom" which allows a global view of information objects.

It is an additional object of the present invention to provide a computer environment in which the user's location is always known to him, so that he can never become "lost"

Briefly, one preferred embodiment of the present invention is a method for interfacing graphically with a user of a computer system having a selecting device, and a display device such as a computer screen, which identifies a relationship structure between physical objects and activities external to the computer system which are related to the information to be manipulated in the computer system. At least one data structure is created which corresponds to the identified relationship structure. A number of on-screen objects which correspond to information identified in the physical objects and activities external to the computer system, are displayed on the display screen. A user selection is detected among the displayed on-screen objects, where each on-screen object has initial size and position states. Intermediate and final size and positions states for each on-screen object are prepared according to the data structures. The on-screen objects in their intermediate size and position states are animated on the display screen, until finally the on-screen objects in their final size and position states are displayed according to the data structure.

A second preferred embodiment is an apparatus for visually displaying information and control objects on a computer display screen having a display device or screen, at least one data tree, a layout object and a sizing object. A number of on-screen objects are provided, as well as a selecting device, such as a mouse for choosing an on-screen object of interest. A size and positioning device uses information from the data trees, the layout object and the sizing object to provide the on-screen objects with final size and posit on state information. An animating device determines intermediate size and position state information for the on-screen objects as they are moved from their initial size and position to their final size and position. A rendering device displays the on-screen objects in initial, intermediate and final size and position states on the display screen.

A third preferred embodiment is an system for visually displaying information and control objects on a computer display screen having a data processing device, a data storage device, an input device, and an output device or screen. Also included are at least one data tree, a layout object and a sizing object. A number of on-screen objects are provided, as well as a selecting device, such as a mouse for choosing an on-screen object of interest. A size and positioning device uses information from the data trees, the layout object, and the sizing object to provide the on-screen objects with final size and position state information. An animating device determines intermediate size and position state information for the on-screen objects as they are moved from their initial size and position to their final size and position. A rendering device displays the on-screen objects in initial, intermediate and final size and position states on the display screen.

An advantage of the present invention is that it allows control over multiple scales of information simultaneously.

Another advantage of the present invention is that a user can have improved access to both local and global information, providing the user with a better understanding of complex data.

An additional advantage of the present invention is that information interacts with the user in a dynamic manner to rearrange documents and objects for easy access and location.

Yet another advantage of the present invention is that as objects are rearranged on the information "desktop", the intermediate location steps are animated, so the user can always remain "oriented" in the data space, and can locate things quickly.

Still another advantage of the present invention is that objects are never positioned on top of each other and thus do not obscure each other from view.

A further advantage of the present invention is that information and controls are always presented in a designed context. The selected object increases in size so that further detail can be accessed, but the surrounding objects are maintained in view. This provides a context for the information which can enable a user to more easily see the relationship of the object of interest to other information which can influence it.

A still further advantage of the present invention is that the user is able to monitor a great variety of variables or controls at one time.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
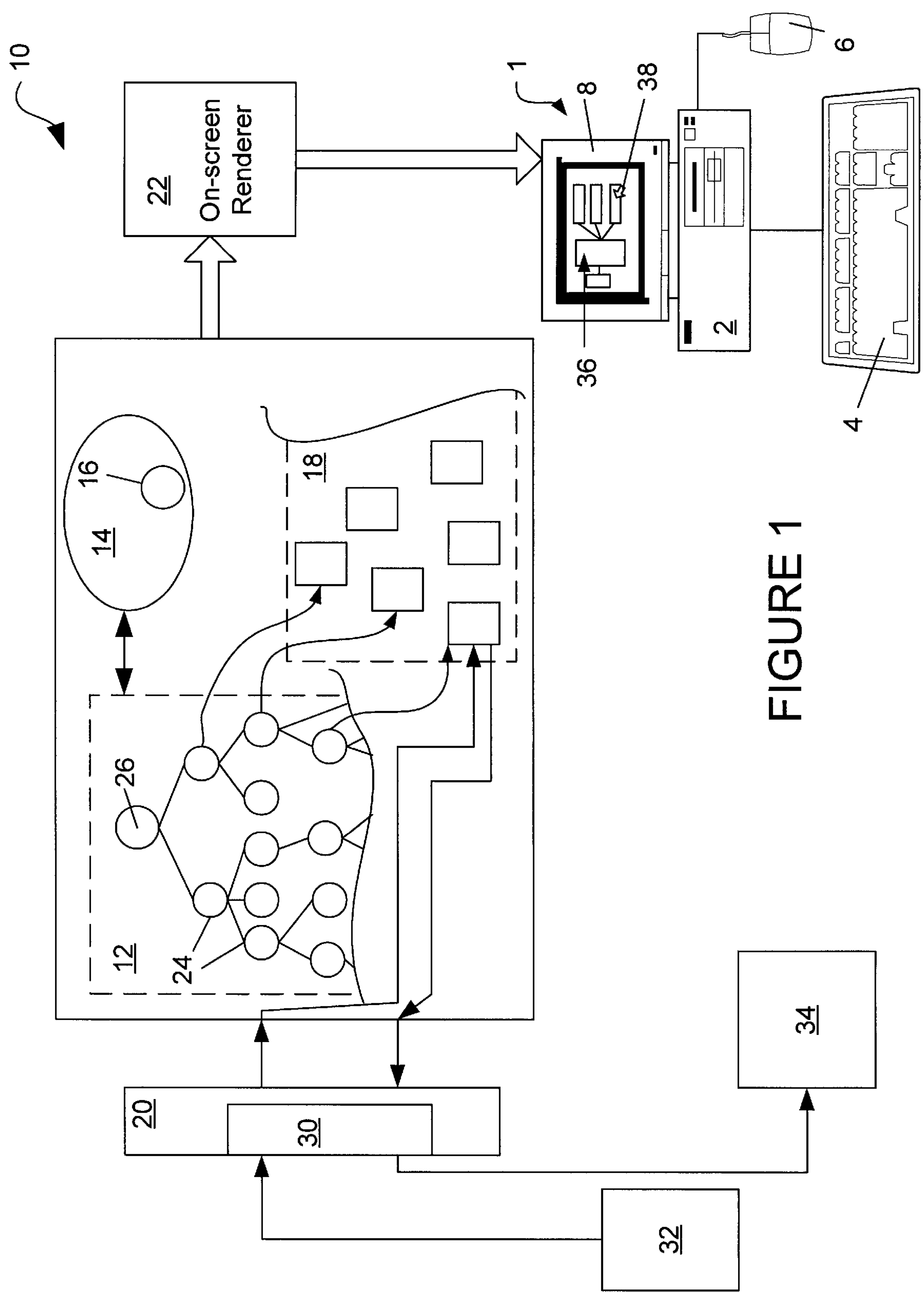
FIG. 1 is a depiction of a computer system and the basic components of the present invention in block diagram form.

A preferred embodiment of the present invention is a graphical user interface which dynamically interacts with the user to present information in a form which allows information to be more easily located and recognized. It allows the user to monitor and control variables from many different scales of information simultaneously, while allowing the user to retain a sense of the relationships among objects and processes that exist on these many scales. This is done by presenting a large navigable information space in which controls, documents, images and other information appear as objects on a large surface. The user navigates by panning until he locates an information object of interest. He can then select the object and make it active. When the user clicks on a window, surrounding windows become smaller, but stay on the screen. These smaller windows still may show their controls and information and the user may still access them. These smaller objects may re-arrange their appearance, perhaps by consolidating their information into a single control. Many panels and controls can therefore occupy a relatively small portion of the screen, and the user is enabled to monitor many parameters at once. As information in these smaller windows becomes important, the windows can be expanded again to give a more complete view of the information and ready access to the controls without losing an overall sense of what the user is viewing.

In the following discussion, there are a number of terms whose meaning will now be defined.

Node—A node is a data structure element which is responsible for an object which may be rendered to the screen. A node has a pointer to its single parent node, an array of pointers to its children nodes, and a pointer to an object to be rendered to the screen. This pointer may be NULL, indicating that this node is used to organize other objects, but does not have an on-screen representation. Additionally, a node contains absolute position information which is used to calculate the actual screen coordinates needed by the screen object. This position information represents the position of the object before the system scale and offset are applied. The screen coordinates are calculated and passed to the screen object, which saves them.

Data Tree—A tree is a collection of nodes. The system can include any number of trees, any number of which can be displayed at any time.

Root Node—A node designating the beginning of a subtree of nodes. Any data tree must have one ultimate root node to which all other nodes ultimately connect. Any node within the Data Tree can be designated as a current root node for the purposes of rendering or data manipulations. In this case, a current root node is a point which indicates which subtree of information is to be considered. All nodes "below" this root node are considered to be within the subtree rooted at that node.

On-screen Object—An on-screen object is any window, control or device which is in view on the screen. These objects contain screen coordinate position information which locates them on the physical display device. Once a system draw has occurred, the object has information about its screen position, and can draw, update, or otherwise affect its on-screen representation. A user can interact with an object locally, by changing the value of a control slider, for example, without forcing a system-wide re-calculation of this information.

As illustrated in the various drawings herein, and particularly in view of FIG. 1, a form of this preferred embodiment of the inventive device is depicted by the general reference character 10.

FIG. 1 shows a computer system 1 including a data processing unit 2, input devices in the form of a keyboard 4 and a mouse 6, and an output device 8 in the form of a display screen. The present invention is an interactive graphical user interface 10 having the basic components of a dynamic tree structure 12, dynamic layout object 14 and sizing control 16, a set of internal objects 18, a socket connection messaging Application Program Interface (API) 20 to external process or processes being controlled, and a renderer 22. The invention is not tied to any one computer operating system or computer architecture, as the renderer 22 may be altered to conform to any system.

The dynamic tree 12 is a set of data nodes 24 which organize a set of internal objects 18 into logical relationships. Note that the tree 12 is independent of the internal objects 18, so that several trees may include the same internal objects 18. There is one overall data structure 12 in the invention 10, but any node 24 within this may be considered a "root" node for the purposes of display. Included in the main tree structure 26 is a pointer to the current root node. It is this root node that is responsible for layout and rendering, through its dynamic layout object 14.

Each tree 12 is connected to a dynamic layout object 14 which controls the dynamic behavior of the on-screen objects 36 as they are displayed on the computer screen 8. This layout object 14 is coupled with a sizing control 16, and the combination of these components determines the final layout and behavior of the on-screen objects 36. A dynamic layout object 14 includes the variables which affect the final layout. The user may control some of these variables (such as the variables D, MinScale, and MaxScale, to be discussed below.)

One or more socket connections 30 may be included to connect the invention to external processes. This process may reside either on the local machine, or on a machine connected to the local machine by a network. A messaging API 20 defines communication between the invention 10 and any external process. Messages received from these sockets 30 affect the information residing in any internal object 18. Layout and other system settings may also be changed by this process.

There are different methods of handling incoming and outgoing messages. At initialization time, an internal object 18 may be registered with a socket 30, so that each has a pointer to the other. An incoming message from an external device or server 32 is routed by the socket 30, which has an array of pointers to internal objects 18 it controls. Outgoing messages to external devices 34, which can be used to control machinery, etc., are sent by the internal objects 18 directly to the socket 30.

The on-screen objects 36 are information or control objects that the user sees or uses to control external processes. Examples of these objects 36 include a web page, a simple text editor, or a control panel with typical GUI controls (sliders, buttons, etc.). These on-screen objects 36 are positioned and sized by the dynamic tree 12, layout 14 and sizing control 16 objects. The internal control objects 18 use the renderer 22 to draw the on-screen objects 36 to the display 8. Typical on-screen objects 36 are shown on the computer display screen 8, as well as a cursor 38, which can be used as a selection device.

The renderer 22 is an object providing an interface to a computer system's graphics display 8. This renderer 22 has access to the global offset point (to be discussed below) and other state information, and uses this information to correctly execute the draw commands it receives from the internal objects 18.

Messages such as mouse clicks and drags are routed to the correct internal object 18 by the main data tree 26.

Figure 2:
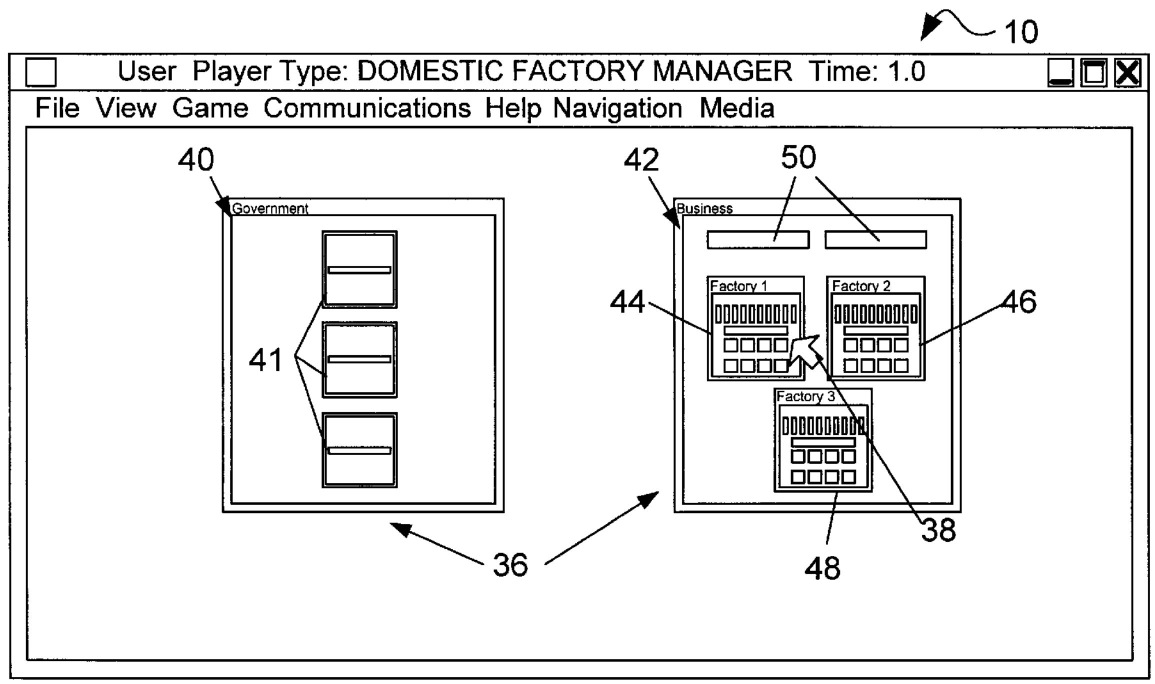
FIG. 2 is a depiction of a computer screen display in which two large information and control objects contain a variety of smaller information objects are shown at Time 1.0.

FIG. 2 illustrates the present invention 10 in use to create the interface to a very simple simulation of a business. It is to be understood that very complex data organizations can be created, but for the sake of illustration, a very simple example is provided. The display shows two on-screen objects 36, Government 40 and Business 42 in their initial states at what will be called Time 1.0. The Government object 40 contains those variables or institutions which it can control, such as tax rates, regulatory factors and interest rates. The smaller boxes 41 inside the Government object 40 might, for example, contain information on import duties on foreign raw materials or data about a new regulation to become effective next year.

The Business object 42 contains three major children 44, 46, 48. The term "children" will be used to refer to those objects contained within a larger object, and that larger object will be referred to as the "parent". The term "major children" will refer to those children which have children of their own, while the term "minor children" will refer to children which have no children of their own. Thus the Business object has three major children, which are Factory 1 44, Factory 2 46 and Factory 3 48 and two minor children in the form of control buttons 50.

A cursor arrow 38 selects Factory 1 44 in the Business object 42. When a selection is made, an event handling routine is called which will include recursive size and position routines (to be discussed below). The objects are eventually rendered to the screen by another routine.

Figure 3:
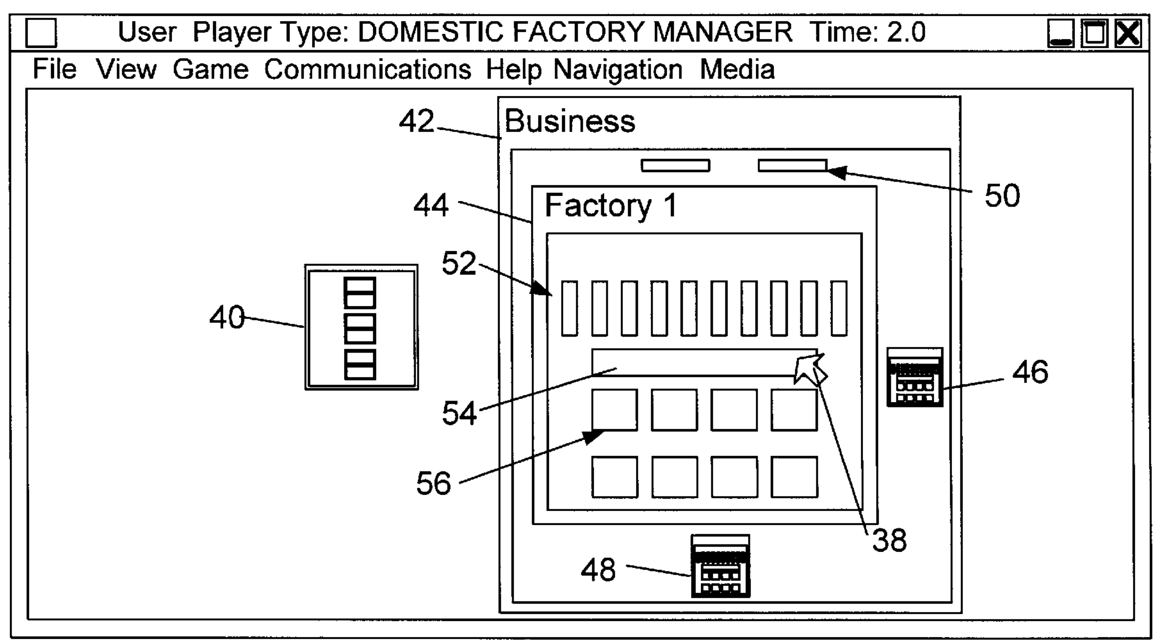
FIG. 3 is a depiction of a computer screen display at Time 2.0, after one of the two large information objects has been selected, and has enlarged.

FIG. 3 illustrates the computer display at Time 2.0. Factory 1 44 is enlarged to its final size and position. Factories 2 46 and 3 48 have shrunk, as have the control buttons 50. Factory 1 44 has its own children in the form of buttons 52 and control panel 54 and image panels 56. Business 42 and Factory 1 44 windows are at their maximum size, and Factories 2 & 3 46, 48 are at their minimum size. The children buttons 52, control panel 54 and image panels 56 of Factory 1 44 are at an intermediate stage, since they can be expanded even more if selected. The cursor 38 is shown selecting the control panel of Factory 1 44.

Figure 4:
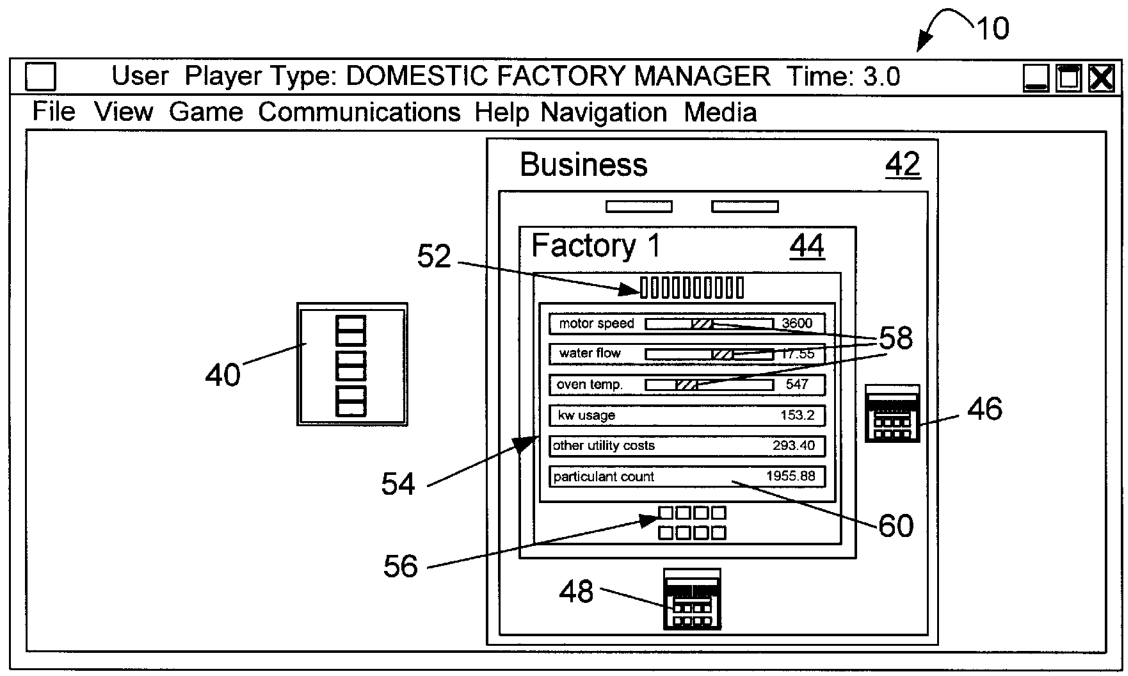
FIG. 4 is a depiction of a computer screen display at Time 3.0, after one of the smaller information objects inside a large information object has been selected, and has enlarged.

FIG. 4 depicts the computer screen display at Time 3.0. The cursor has previously selected the control panel 54, which has enlarged, while buttons 52 and image panels 56 have shrunk. Factory 1 44 and Business 42 remain the same size, since they have already been maximized. The controls 58 within Factory 1 are now accessible as sliders, and through the socket interface 30 (see FIG. 1) the user can manipulate various operations such as machine speed, coolant flow, and oven temperature, etc. Information concerning the state of operation is fully displayed to the user. Other information 60 is now readily accessible as well.

Figure 5:
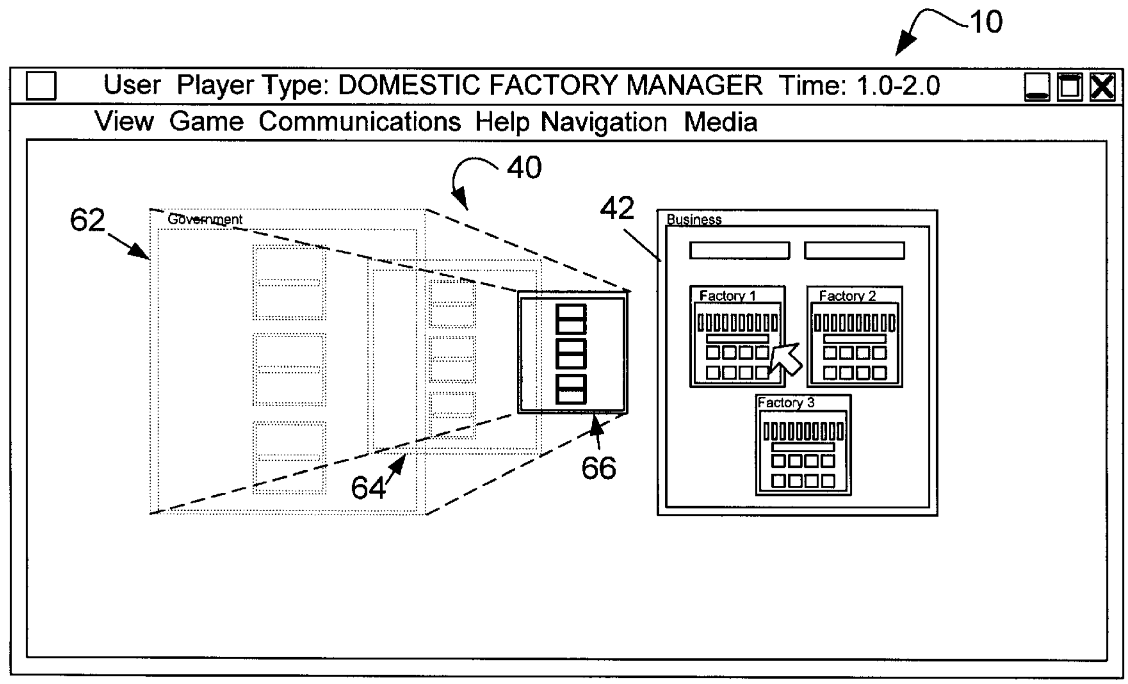
FIG. 5 is a depiction of a computer screen display at an intermediate time between Time 1.0 and 2.0, showing the initial and final positions, as well as one intermediate animation step in the rendering of an information object.

FIG. 5 shows a detail of Times 1.0–2.0 for the Government object 40 only, which was shown initially in FIG. 2 as it is animated in stages from its initial size and position to its final size and position. The large box drawn in dashed lines 62 is the state of the object at Time 1.0, the initial size and position. The intermediate box drawn in dashed lines 64 could be called Time 1.5 and shows an intermediate step in the animation of the object before it reaches its final size and position 66 at Time 2.0. There will be a similar intermediate animation step for all objects displayed on the screen. In general, there is more than one intermediate animation step between the initial and final display configurations. This animation is intended to keep the user informed about where the animated objects are going, so that the user does not get lost. The number of steps in the animation can be controlled by the user, and is intended to provide a smooth yet quick animation between the object's initial and final positions. The speed of the machine which is running the interface is the largest single factor in establishing how fast an animation will occur. Because the responsiveness of the machine is a function of processor speed, memory size, and the activity status of given applications at any one time, it is impossible for the invention to determine what a "best" animation speed may be. The invention is set for a generally comfortable speed on an average machine, and refined control of an animation speed is therefore left up to the user.

Figure 6:
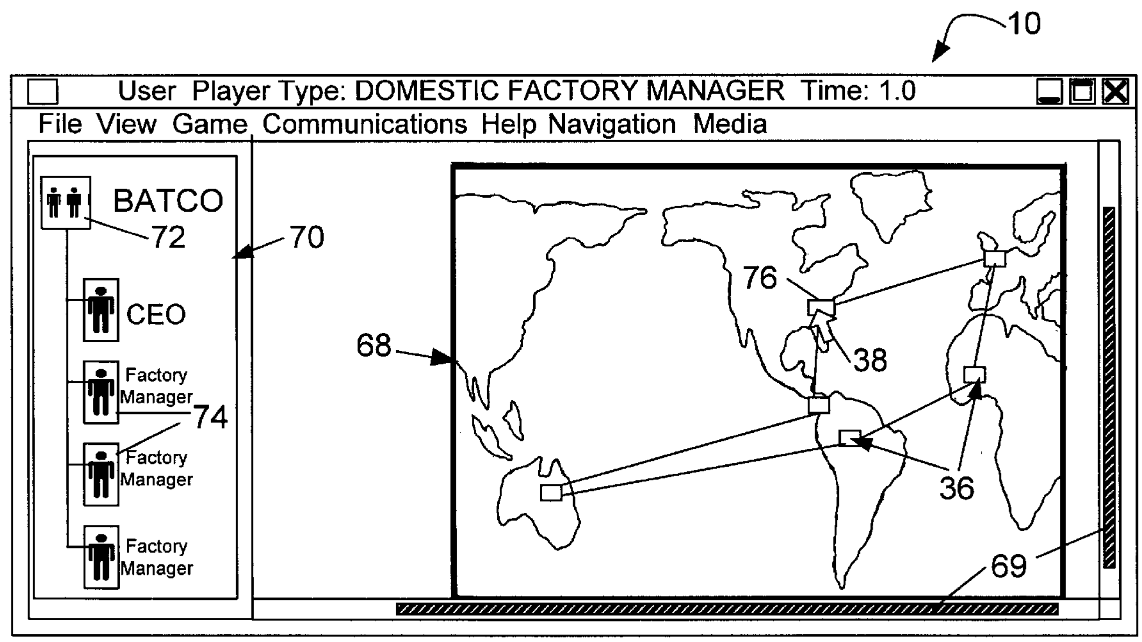
FIG. 6 is a depiction of a computer screen display at Time 1.0, showing an alternate arrangement of information and control objects which have been arranged on a World Map.

FIG. 6 shows another example of the use of the present invention. The starting display at Time 1.0 is depicted in use controlling another business simulation. This view shows a Map view 68 representing the company's factories and headquarters depicted as on-screen objects 36 in their locations around the world. Slider bars 69 are included to allow the field of view to be scrolled up and down or sideways in a manner which is well known in the art. The user may also desire to increase the apparent field of view by zooming out. In this preferred embodiment, the user initiates a zoom by using a combination of keystrokes, such as holding the control button down and pressing the up key to zoom in and the down key to zoom out. In zooming in or out, the global offset point is altered so that the global_z increases or decreases. After a change is made to global_z, a system redraw is done, and the user perceives the new position. This process is discussed in more detail below.

A box on the left is a navigation window 70 which can be used to quickly traverse the map sites, and is most useful when the user is zoomed or transported into a site. Transporting is done by immediately enlarging the selected object to its final size without intermediate animation frames. Transporting is achieved by changing the current root node, and executing a redraw of the system.

The navigation box 70 contains a highest level icon 72 and several lower level icons 74, which are used to control overall navigation in the view. By clicking on an icon 72, 74 the user is zoomed or transported to the site indicated. At any time, the user may return to this map view 68 by clicking on the highest level icon 72 in the navigation window 70.

In this instance, the object representing the Corporate Headquarters 76 in the United States has been selected by the cursor. Intermediate animation steps allow the user to see the selected object 76 enlarge by steps until the Corporate Headquarters object 76 has reached its final size, as seen in the next figure.

Figure 7:
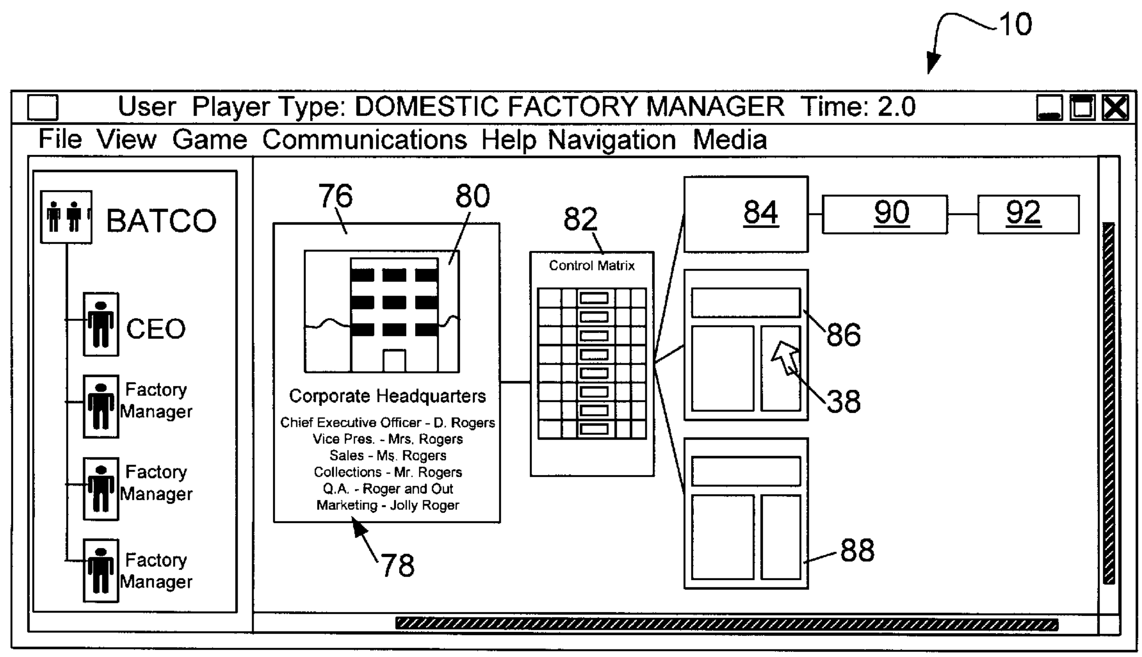
FIG. 7 is a depiction of a computer screen display at Time 2.0, after an on-screen object has been chosen and enlarged.

FIG. 7 shows the enlarged Corporate Headquarters on-screen object 76 at Time 2.0, with its children. In this preferred embodiment, the on-screen objects have been laid out in a tree structure, so that children of a parent object are found to the right of the parent on the screen, and they are connected by lines. Typical information concerning corporate personnel 78 can be seen along with a graphic image 80 depicting the Corporate Headquarters building. This can be a color picture taken from a photograph which has then been digitized and incorporated as a graphic. A Control Matrix 82 is shown as the next highest level child, and has three children 84, 86, 88, one of which 84 has a child object 90 of its own. A cursor 38 is shown selecting a child object 86 of the Control Matrix 82.

Figure 8:
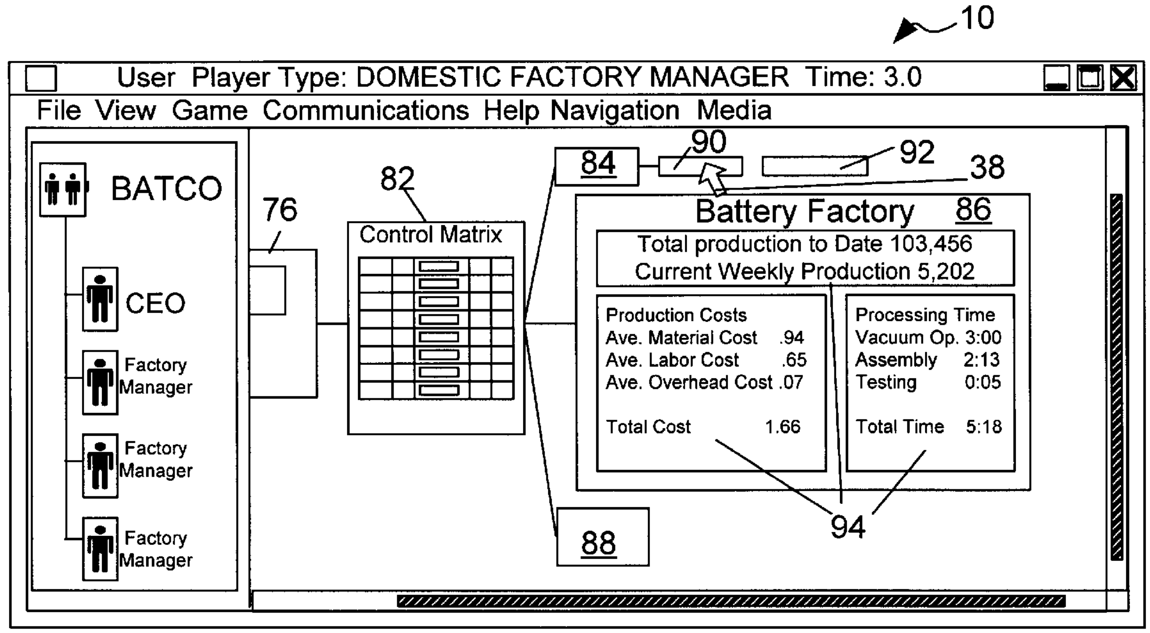
FIG. 8 is a depiction of a computer screen display at Time 3.0, after a second on-screen object has been chosen and enlarged.

FIG. 8 shows Time 3.0, with the result of the previous selection. The child object has enlarged to identify itself as a Battery Factory 86, and various production information can be seen in the information boxes 94 included. The Corporate Headquarters object 76 has been reduced in size, and lies partly off the screen. A cursor 38 is shown selecting another on-screen object 90, which is the child of object 84, and object 90 is seen to have a child 92 of its own.

Figure 9:
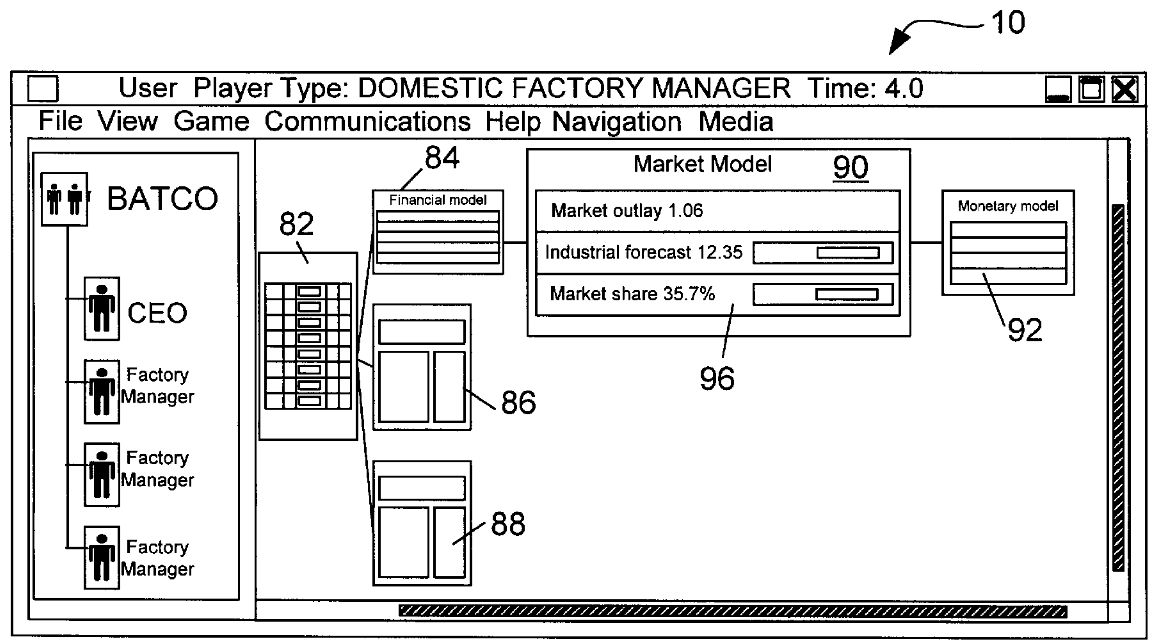
FIG. 9 is a depiction of a computer screen display at Time 4.0, after a third on-screen object has been chosen.

FIG. 9 illustrates Time 4.0. The previous selection has caused the Market Model object 90 to enlarge, since it is now the selected window. Information is now visible in the included boxes 94. Note that both the parent Financial Model object 84, and the child Monetary Model object 92 have enlarged to a intermediate degree, since they are attached to the selected window. The Control Matrix 82 and the Battery Factory objects 86 have both reduced in size and lost their internal detail. The Corporate Headquarters object 76 has moved off screen entirely.

Figure 10:
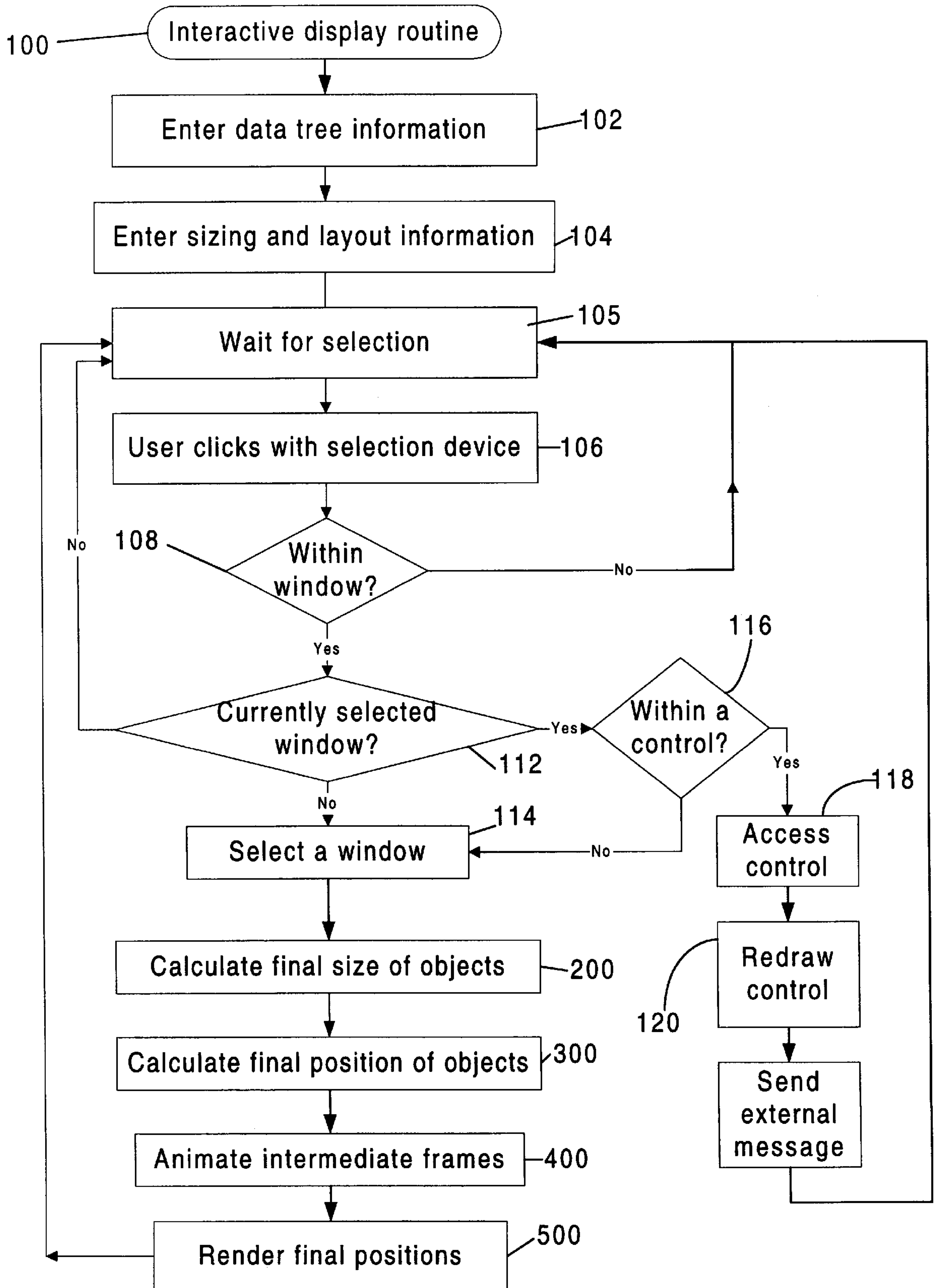
FIG. 10 is a flowchart illustrating the steps involved in responding to a user selection.

The steps involved in the process of creating and selecting on-screen objects are shown in FIG. 10 as a generalized flowchart of operations in response to a user action.

The steps of the flowcharts to follow may be implemented by one or more software routines, processes, subroutines, modules, etc. It will be apparent that each flowchart is merely illustrative of the broad logical flow of the method of the present invention and that steps may be added to, or taken away from, the flowcharts without departing from the scope of the invention. Further, the order of execution of steps in the flowcharts may change according to different implementations such as interrupt-driven, polled, etc., event-handling. A multiprocessing or multitasking environment could allow steps to be executed concurrently. For ease of discussion, the implementation of each flowchart is referred to as if the flowchart were implemented in a single "routine".

FIG. 10 shows the basic steps which occur when a user or process utilizes a device such as a mouse to request an update to the layout together with the preliminary steps necessary to establish the data tree and the layout and size objects which provide information to the internal objects which correspond to the on-screen objects.

The overall process of interactive on-screen object display is referred to by the reference character 100. The designer must first create the data tree structure 102, which organize the set of data nodes which provide relationship data to the internal objects. The data tree also includes a pointer to the current root node.

Next the designer customizes the dynamic layout and sizing control objects 104 by loading them with variables such as distance D, MinScale, MaxScale, tree distance decay factor, the style of layout arrangement and the type of animation acceleration functions (all to be discussed below).

After these preliminary steps have been established, the invention waits 105 for a selection event to be initiated by a user 106. The invention first finds the on-screen object the user has selected, and decides what action is intended.

When the user clicks with a selection device, a decision is made whether the selection was made in a window 108. If not, the routine loops back and waits for the next selection event 105. If the selection is within a window, another decision is made whether the window is the currently selected window 112, or in other words whether it is already designated as the current root node. If it is not the current selected window, the system concludes which particular window was selected 114 and rearranges the layout of the windows according to the design of the data tree and the layout control. This is done by first calculating the final size of the objects 200, and calculating the final position of the objects 300. Size and layout calculations are produced independently to promote reuse of code. A library of layouts are included with the invention, and it is anticipated that both the inventors and independent third party developers will add to this library over time. Similarly, size calculation objects can be built into a library, so the invention promotes interaction of different algorithms from different designers.

Intermediate steps of size and position are calculated "on the fly" (without being stored) for all the onscreen objects, and the objects are rendered to the screen as an animation step or "frame" 400. There is a system delay, which gives the user time to perceive the animation rendering frame. Then the next animation frame calculations are performed, and the results displayed until the last intermediate step has been completed. The final state of the objects is then rendered to the screen 500, and the program awaits the next selection event.

If the window has already been selected 112, the program checks whether it is within a control 116. If not, the routine concludes that a window object has been selected 114, and proceeds with steps 200–500, as above. If it is within a control, the user can access the control 118. The control is updated by being drawn to size 120, perhaps using a special rendering routine (to be discussed in FIG. 14, below). If a socket connection has been made through the interface 20, (see FIG. 1, above), control messages can be routed to an external device to control its operation.

Figure 11:
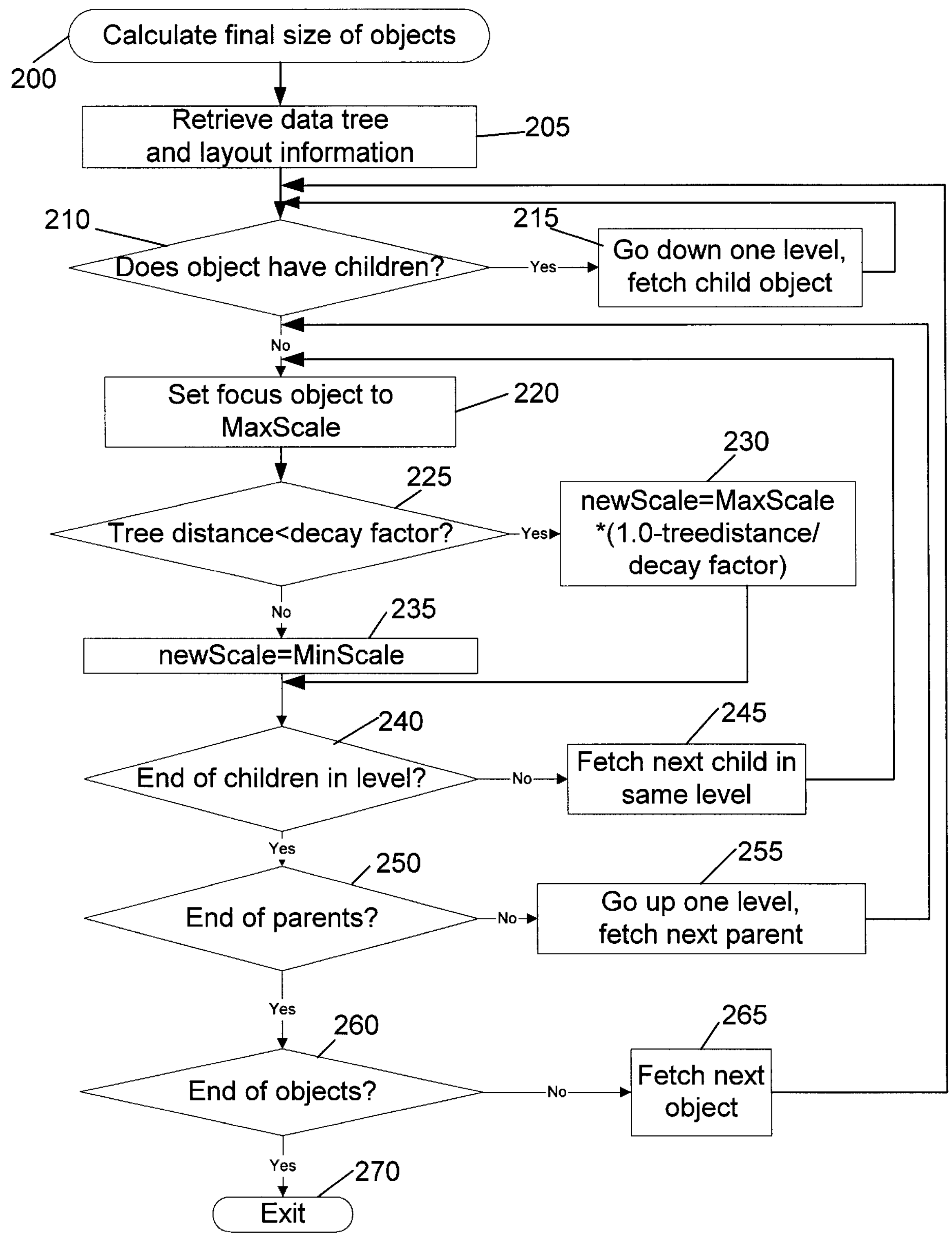
FIG. 11 is a flowchart illustrating the steps involved in calculating the final size of on-screen objects.

FIG. 11 shows the detailed steps involved in calculating the final size of the objects to be rendered to the screen. This sub-routine is entered from step 200 in FIG. 10. Information from the data tree and layout and size information is retrieved to initiate the calculations 205. The layout responsible for the highest level tree determines how big the final objects will be. This highest level layout takes into account the focus, screen space available and the overall zoom or magnification of the system. There are also a number of possible layouts for the groupings of objects. The designer can specify the layout type. The type of layout will partly determine the size of the objects as it relates to the available screen dimensions. For example, it is possible to specify that the overall layout of objects be arranged in either a horizontal line or a vertical line. Since computer screens are not usually square, a vertical line arrangement dictates smaller object sizes than a horizontal line arrangement. This constraint enters into the size calculation.

Since the size of the parent depends on the size of its children, and of its children's children, etc., the routine must first locate the minor children (those with no children of their own) within a larger object. As a terminology convention, these minor children will be referred to as being the "lowest level" objects, and any child object's parent will be referred to as being on a "higher level" relative to that child.

The lowest level children are located by deciding whether the object has children 210. If it does, the routine goes down one level and fetches the child object 215 and repeats this cycle until an object with no children is located. A sizing routine is then applied to the child object. This sizing routine can take many forms. For example, a simple size calculation sets the scale of a selected node to 1.0, and sets the scale of any other objects to some size less than 1.0. Any object directly connected to the focus object receives a scale factor of 0.5, and all other objects are assigned a scale factor of 0.2. This entire process is accomplished by first setting the scale of every object in the affected data tree(s) to 0.2. The scale of the focus node is set to 1.0. The focus node's child pointers are followed, and each receives a scale of 0.5. This simple method of sizing is then finished.

A more complex sizing method is shown in FIG. 11. The focus object is given a scale factor of 1.0, also called MaxScale 220. All other objects have a scale based on its "tree distance" from the focus node. "Tree distance" is calculated by counting the number of edges between the object of concern and the focus object. A "decay factor" determines how far away from the focus object the influence of a scale factor will be used. If the tree distance is less than the decay factor 225, then a ratio of the tree distance to the decay factor is calculated and the MaxScale is reduced by this amount 230. If the tree distance is greater than or equal to the decay factor, then a default MinScale, perhaps 0.2, is assigned to the object 235. The result is that the focus object is maximized, and those objects nearby, but not necessarily joined to the focus node, are assigned intermediate sizes, which decrease with the tree distance. The designer of this layout determines reasonable value ranges and initial values for MaxScale, MinScale and the decay factor. The user can alter these values to suit his preferences by manipulating system properties sliders.

These two methods are merely examples of the many possible methods of size assignment which are possible. Accordingly the present invention is not to be considered to be limited to only these methods.

After the first child object in a level is sized, the other children in the same level are fetched until all are sized 240, 245. Then the parent is fetched and sized 250, 255, working upward through the levels until all parents in the overall object are sized. Then the other on-screen objects are fetched 265 and sized until all have been calculated 260. The routine is then exited 270.

Figure 12:
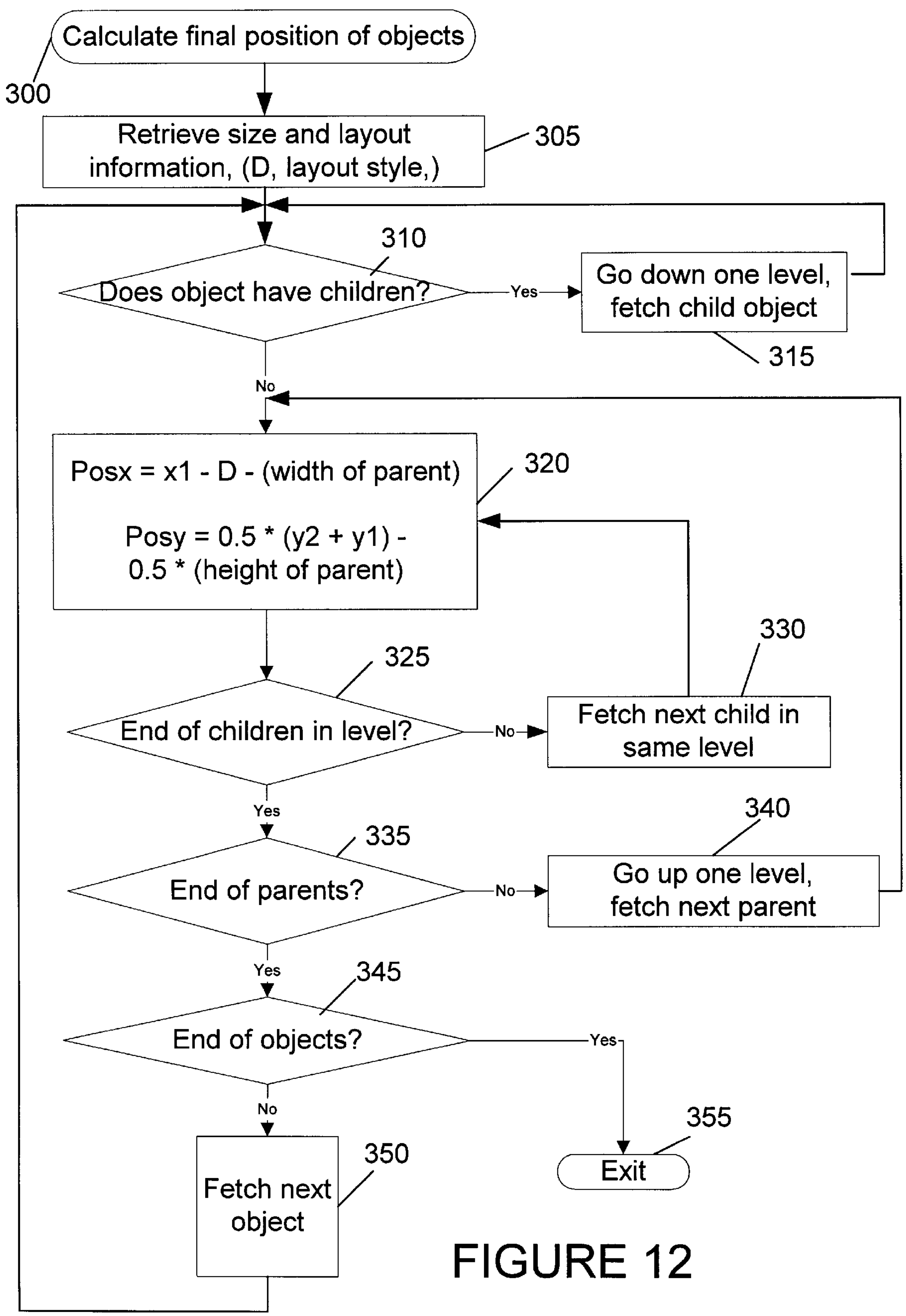
FIG. 12 is a flowchart illustrating the steps involved in calculating the final position of on-screen objects.

FIG. 12 shows the steps involved in calculating the final position of the objects 300. This sub-routine is entered from step number 300 in FIG. 10. As in the sizing routine, the overall layout is important in establishing the final positions of the objects. The layout Application Program Interface (API) allows the system to accept any on-screen layout that can be designed into a recursive algorithm. There are eight pre-constructed layouts which include horizontal and vertical linear layouts, as mentioned above. Circular layouts are also possible, and are useful for applications such as slide shows. A selected object can, for example, move to the center of the circle and enlarge. Alternately, the focus object can remain in the circle, but enlarge in place, as the other objects reduce in size and reposition. Another arrangement allows all the children of a selected object to form a circle around the selected object. The preconstructed layouts are available for use, but the designer can create his own, and the present invention is not limited to the preconstructed arrangements listed.

When positioning objects on the screen, the layout object must have information about other objects on the screen which affect it. Size and layout information is retrieved. As with the size calculation, the position of a parent object will be typically determined by the size and position of its children. Thus the positioning sub-routine is used recursively, staring with the minor children and working upward through the levels of parents. The object is checked for children 310, and if there are children the routine goes down one level 315 until the lowest level child is found.

There are several different positioning algorithms which may be used 320. FIG. 12 shows a preferred embodiment which the following formulas are used to establish the x and y coordinates (Posx, Posy) of the lower left vertex of a rectangular parent object based on the upper left vertex ($x_1$, $y_1$) and lower left vertex ($x_2$, $y_2$) of a rectangular child object:

$$Posx=x_1-D-\text{(width of parent object)};$$

$$Posy=0.5*(y_2+y_1)-.0.5*\text{(height of parent object)}$$

The variable "D" determines the minimum allowed distance between objects on the screen. The designer specifies a range and initial value for D, and the user can change it to suit his taste by manipulating a system properties slider.

All the children in a level are processed 325, 330, then the parents are fetched 340, until all are processed 335. Then the next object is fetched 350, and its lowest level children found 310, 315 until all children and parents are processed 320. This continues until all objects are finished 345 and the routine is exited 355.

Figure 13:
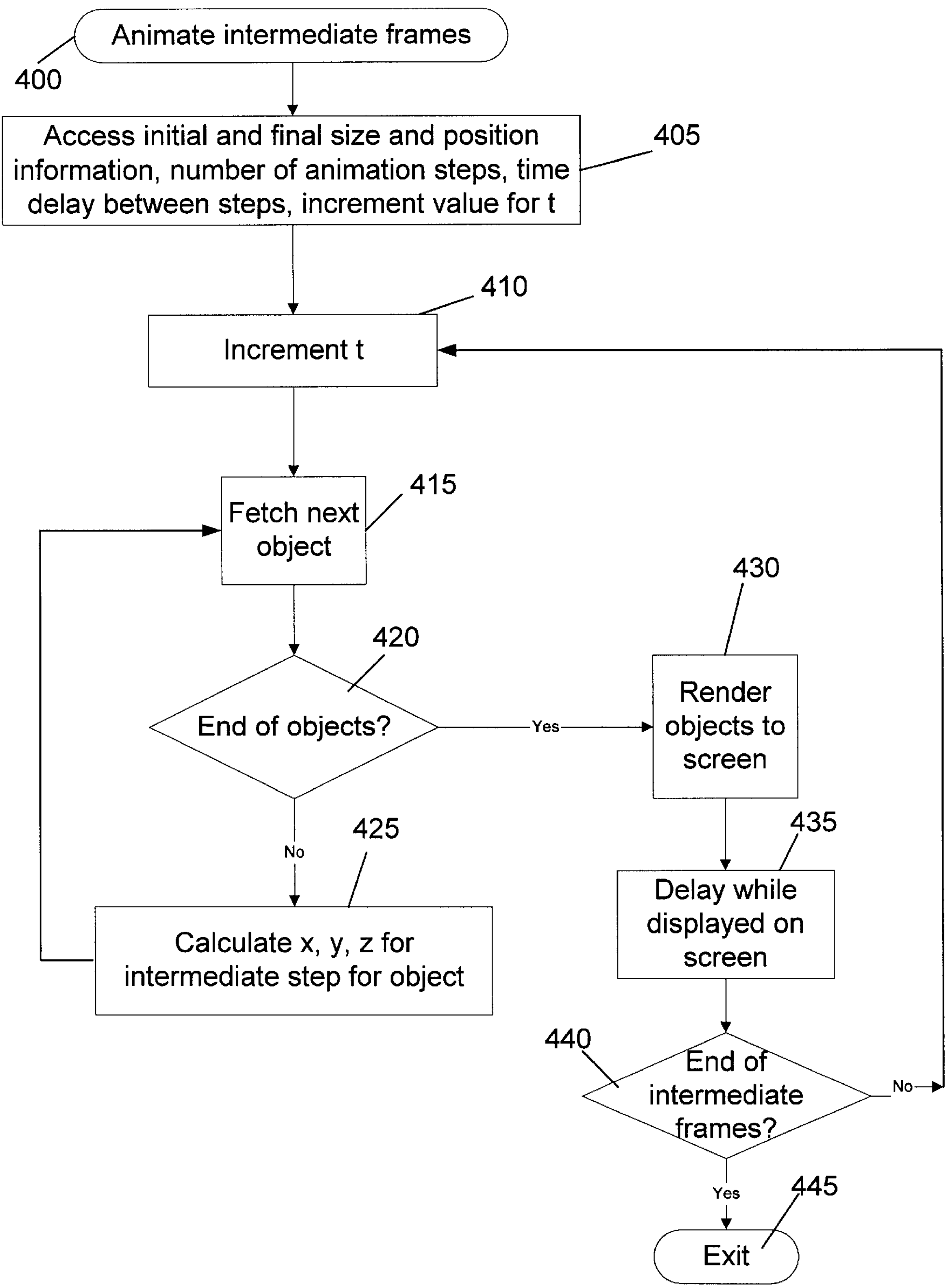
FIG. 13 is a flowchart illustrating the steps involved in producing the intermediate frames of an animation sequence.

FIG. 13 shows the basic steps involved in the intermediate steps of animating the objects from their initial position up to their final position. This sub-routine is entered from step number 400 in FIG. 10. The initial and final size and position information, which has been calculated and saved in the previous steps, is retrieved 405. An interpolation is then performed on the path of each object. This is done by multiplying by a variable "t" which increases from a value of 0.0 at the initial position (Time 1, as in FIG. 1) to a value of 1.0 at the final position (Time 2, as in FIG. 2). The number of animation steps, n, will be determined by the designer, although the user can control this, within limits. The number of steps is generally a function of the speed of the machine and the number of objects being rendered on the screen, so it is left to the user to find a comfortable setting for this. The invention is set to provide a comfortable animation on a typical machine.

The designer can control the behavior of "t" as the n animation steps are performed. Research has shown that screen objects which accelerate and decelerate as they animate across the screen are more easily tracked by users, and the transitions are more "comfortable" and "realistic". The invention provides several methods for mapping a time increment to an acceleration path.

A constant mapping function provides values for t such as:

$$t=\{0.0\ 0.2,\ 0.4,\ 0.6,\ 0.8,\ 1.0\}$$

Note that each animation step increment is matched with an equal increment in t. The object thus takes equal steps along its animation path. In contrast, a slow-in slow-out function would provide values such as:

$$t=\{0.0,\ 0.05,\ 0.1,\ 0.5,\ 0.9,\ 0.95,\ 1.0\}$$

Note that the object would take small steps along the vector initially, and would then accelerate in the middle of the sequence, and slow down at the end again.

Note that values of 0.0 and 1.0 are always present, and there is, in this embodiment, an enforced restriction that at the halfway point of the animation, t=0.5;

In order to provide this slow-in, slow-out acceleration of objects, the invention provides several functions from which to choose. These functions take a step number and a total number of steps, and output a value on the range 0.0 to 1.0 Output behavior includes a constant rate of increase, a slow-in-slow-out function, and a slow-in-constant-out function. The designer determines ranges and initial value for "n", the number of animation steps. The user can change this value to suit his taste by manipulating a system properties slider.

The following formulas are used to establish the x and y coordinates ($Posx_i$, $Posy_i$) and the size factor $Posz_i$ at each step interval i;

$$Pos\ x_i=x_{initial}+t_i*(x_{final}-x_{initial});$$

$$Pos\ y_i=y_{initial}+t_i*(y_{final}-y_{initial});$$

$$Pos\ z_i=z_{initial}+t_i*(z_{final}-z_{initial});$$

As t moves from 0.0 to 1.0, the objects move along a straight path to the final positions and shrink or enlarge as required by the change in scale, z.

In FIG. 13, t is calculated 405, using the function chosen by the designer. The value of t is incremented to its first non-zero value 410. The next object is fetched, if there is one 415. Values for $Posx_i$, $Posy_i$, and $Posz_i$ are calculated from the above formulas 425. Then the next object is fetched 415 until the last one has been processed. Then the objects are rendered to the screen 430. A delay routine 435 is called to allow the user time to perceive the animation frame. If the last animation step has not been completed 440, then t is incremented 410 and the routine repeats until the final animation frame is displayed and the routine is exited 445.

Referring back, FIG. 5 has a very simple example of an intermediate animation step. In this preferred embodiment, calculations of t require that at time $t_i$=0.5, the output for the acceleration path be 0.5. Therefore, the intermediate frame 64 shown is at the halfway point in the overall path. After the last intermediate animation frame has been rendered, the drawing of the objects in the final state is rendered 500 (see FIG. 10) and the program waits for the next selection event.

Figure 14:
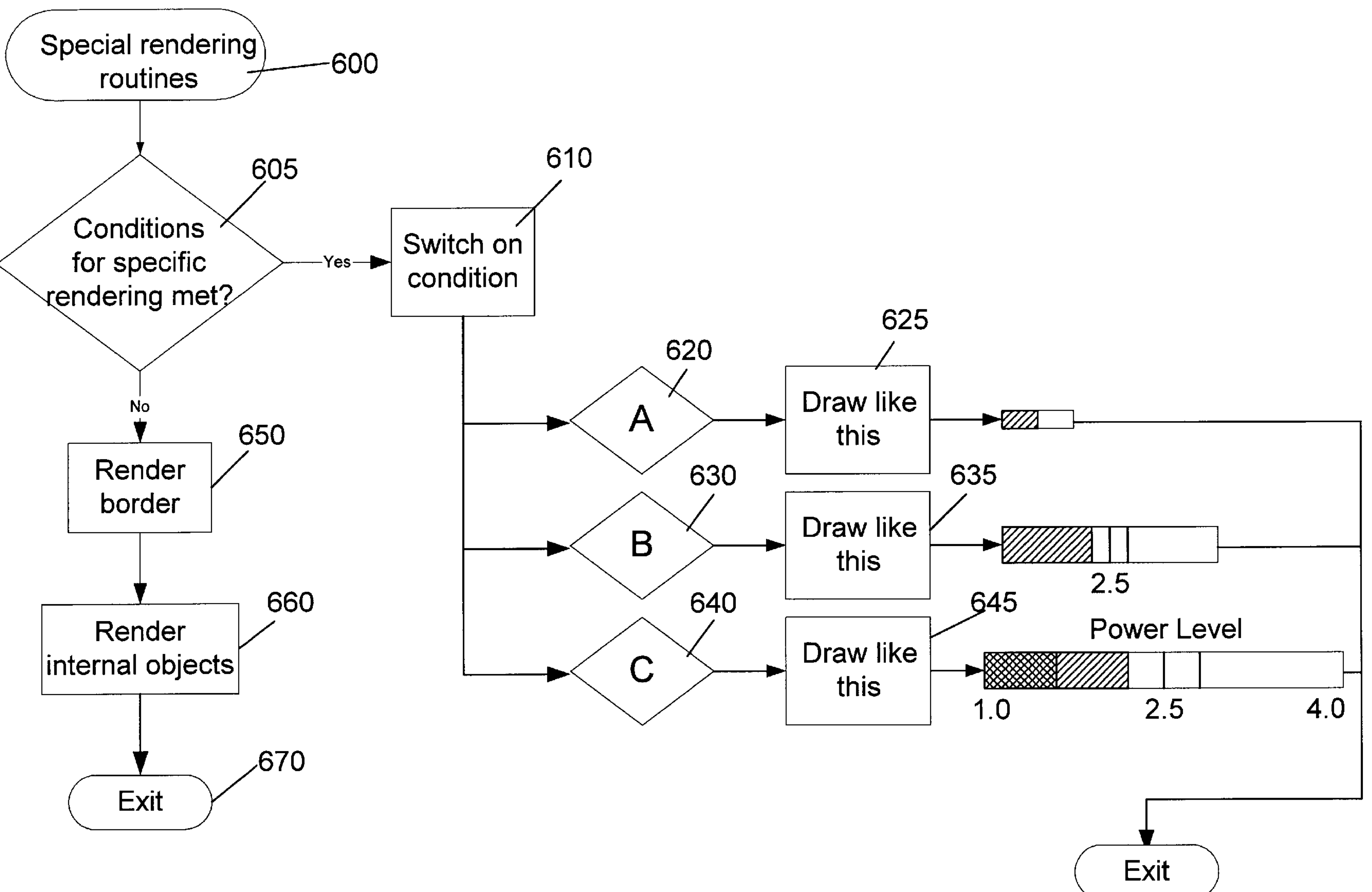
FIG. 14 is a flowchart illustrating the steps involved in rendering objects to the screen.

The details of rendering the objects to the screen are shown in FIG. 14. This sub-routine is entered from step 430 of FIG. 13, and step 500 of FIG. 10. Because these objects are rendered at a variety of sizes, there is considerable possibility for variation in the details of this rendering routine. At each size, and in each state, an object attempts to present as much useful information as possible. At some sizes, text is unreadable, and displaying it would waste CPU time as the system calculates and draws it. Alternatively, at very large sizes, text may simply get in the way, and will not be drawn. In this preferred embodiment of the present invention, a decision is first made whether a special type of rendering is required. Conditions of the object such as size, position, or content are checked, and if the specified conditions are met, a special render routine or variety of render routines may be called. In the illustrated example, the call is made to a render decision tree 600, which will cause an object to be rendered in more or less detail depending on the on-screen size of the object. This figure shows a value which the user may change, but which may also be changed by an external process. Thus, both control and monitoring are necessary parts of this slider. A user must see how a value is changing in order to react to it.

The routine checks for conditions which indicate that specific rendering is required 605. If so, then the routine branches 610 to one of three rendering routines designated here as A 620, B 630 and C 640. If the size of the object, in this case a control slider, is less than a specified limit, branch A 620 is taken and the slider is rendered with no textual information 625. The slider is so small that the user could not read the text if it were to be included, so the text is eliminated to make the screen display less cluttered, and to save on rendering time. The designer has determined that the only information which can be shown at small sizes is a graphical representation of the slider's value. At this small scale, the user can see a general level, and can react if a gross change is shown. In this render state the slider cannot be controlled by the user, but is providing contextual information. Note that a representation such as this may be drawn while the system is animating, in order to reduce the drawing time required by each animation step.

If the size of the slider is greater than the minimum, but less than an established upper limit, then condition B 630 is met, and a rendering of intermediate detail is performed 635. In this case, the slider is rendered larger, and textual information is displayed which indicates the value of the variable controlled by the slider. At this mid level of control, the user can access the slider with the mouse and control the slider's level. Because text is used to display the actual level of the slider, the user can closely monitor actual values it represents, and react to smaller changes in the data. A middle level of information is rendered to the screen, though more is available at larger scales.

If the size of the slider object is greater than an upper designated size, condition C 640 is met. The slider control is then rendered with full detail, including a textual control label, limit text, and previous value indication markings. This is the render state designed for fine interactions, and includes the most detailed information available on the slider.

If none of the conditions are met, the main information is not rendered. This may occur if the object is too small, or some state is preventing the object from rendering, even if it is large enough. This could happen if the control has been deactivated. In such a case, the basic system elements, such as the border, are rendered 650, and any internal objects are then recursively rendered to the screen 670.

In determining the position and size of objects on the screen, position and scale calculations are made concerning the scaling of the on the view of entire system display. The system maintains a global offset point which affects the way objects are displayed. This information controls the panning of the view as well as the magnification used in zooming in or out. This global offset point is defined as (global_x, global_y, global_z), where z is the scale factor. Objects have a position and scale as well, and it is the combination of the two factors which determine an object's final position and size. The following equations show how an object's position data is calculated:

```
object_x=(int) ((node_x)*global_z)+global_x);

object_y=(int) ((node_y)*global_z)+global_y);

object_width=(int) (node_width*node_scale*global_z);

object_height=(int) (node_height*node_scale*global_z).
```

As global_z is increased or decreased, the objects in view grow or shrink, and a zoom in or out, respectively is performed. Likewise, as a node's scale is altered, the node changes as well. These changes are applied to the object, and thus there is a change in the rendering of the object to the screen.

In addition to the above mentioned examples, various other modifications and alterations of the inventive device and process may be made without departing from the invention. Accordingly, the above disclosure is not to be considered as limiting and the appended claims are to be interpreted is encompassing the entire spirit and scope of the invention.

INDUSTRIAL APPLICABILITY

Information in our society is more available, and more available in a greater number of different scales of magnitude than ever before. Scales of information refer to the size of the portion of the world to which they are related. For instance, information may be related to factors which affect the world globally, nationally or locally. We are often concerned with the relationships between different scales of information. Businesses in particular are often very concerned with a number of variables of various scales which can affect their performance. These variables can range from global concerns, such as the effect of stock declines in Asia, to national concerns such as the effect of altering taxation rates, to very localized information, such as the cost of rental space or utilities.

Among these different scales of information, each user will find certain information useful and other information meaningless. The status of these kinds of information is changeable. The focus of interest will be variable, but although the focus may shift, it is still important to see the factors surrounding and contributing to the focus of interest. Thus, understanding connections between information is more useful than viewing isolated pieces of information. Context becomes important. A system of organizing data will be more effective if it can display all levels from the global to the local, while still providing the user with a sense of relationship between the different scales. The present invention 10 provides such a manner of organizing data in ways that allow an easy appreciation of information in a larger context. This is done by presenting the information in a "focus plus context" system which allows close inspection of a focus object while still maintaining the context of that object in a larger system. The user is aided in tracking the continuity of relationship between objects by the way the objects are organized in an easily viewable manner, and by the way the movement of objects is smoothly animated, so that their changing position is easily noted.

There are many industrial applications for the graphical user interface of the present invention. Almost any computer user who deals with a large number of documents or files of any type can benefit from a system which allows easier location and access to information. Thus the following applications are merely representative of a vast number of uses.

One such application is for "data mining". Users may search for information within a large database in these systems. These include applications for the Internet, and for internal company documentation, among others. Since data files and documents can be grouped as to areas of common concern or interest, and the relationships between groups easily mapped, the structure of a corporate or governmental entity is easily represented in a file organization structure. The chain of command in each department of a company can be reproduced, and documents related to each department can be attached where they will be logically found with ease. For example, a corporation can organize files so that the Board of Directors is at the top of a structure, with the President connected beneath, two Vice Presidents beneath him, and a Legal Department which reports to one of the Vice Presidents. Within the Legal Department, various documents can be seen as thumbnail representations or icons. By selecting the Legal Department with a pointing device, the Legal Department object is enlarged, and the surrounding objects shrink, while still remaining visible. The enlarged Legal Department object now displays several documents which can be identified as the Articles of Incorporation, the minutes to stockholders meetings, and a copy of a pending patent application. Selecting any of these objects allows them to be enlarged to allow the text to be read. The patent application might have a box included, which when enlarged would have contact information for the patent attorney who prepared it, or prosecution history information.

The present invention is also very useful for control of complex systems. These include control of factory floors, communications systems, and medical monitoring systems. An example of this would be in computer-aided manufacturing. The manufacturing process can be modeled by graphical representations of different processing modules. A graphical user interface may display the factory as a whole with these processing modules included, and these modules can enlarge when selected to display a panel of control sliders. Textual information can be used to include performance recommendations or safety limits to inform the user who manipulates the controls. The control sliders may control such variables as conveyer belt speed, oven temperature, sputtering element voltages, or drill speed. By using a computer interface, operating parameters of manufacturing equipment can be directly controlled. The "focus plus context" nature of the present invention allows a user to more easily understand the impact that manipulating a control variable in one process module will have upon the factory's performance as a whole. Consequently, optimized performance is more easily achieved.

In addition to controlling complex systems, the present invention can be used to simulate systems. Computer models of factories or international banks can provide users with the chance to try variations in production techniques and business strategies without the risks that real-life manipulation could generate. The present invention is very well suited to such simulations because a great number of parameters can be monitored simultaneously. A sense of the interrelationships between these parameters in the overall functioning of the factory, international bank, or other model, is easily maintained. Users can experiment with variables which control overall or very minute portions of a simulation, and observe the effects of those changes on the overall system. As an aid to experimentation, the present invention can result in great cost savings by optimizing performance.

The present invention can also be used in Computer Based Training (CBT). People being trained in the operation of complex systems of procedures can learn more quickly and effectively when they are able to see the larger context relative to the specific operation they are learning. The present invention is very helpful in providing this view both of the operation specifics and of the overall context. Additionally, many types of industries and educational institutions can use the present invention to present multimedia information to users so that they may learn new procedures more quickly.

For the above and other reasons, it is expected that the process of the present invention will have widespread industrial applicability. Therefore, it is expected that the commercial utility of the present invention will be extensive and long lasting.

What is claimed is:

1. A method of interfacing graphically with a user of a computer system having selecting means, and display means, the steps comprising:

(A) identifying a relationship structure between physical objects and activities external to the computer system which are related to the information to be manipulated in the computer system;

(B) creating at least one data structure which corresponds to the identified relationship structure;

(C) displaying on said display means a plurality of on-screen objects which correspond to information and processes identified in the physical objects and activities external to the computer system;

(D) detecting a user selection among the displayed on-screen objects, where each on-screen object has initial size and position states;

(E) preparing intermediate and final size and positions states for each on-screen object according to said data structures;

(a) calculating the final size of the on-screen objects;

(b) calculating the final position of the on-screen objects;

(c) determining which of said special rendering routines is required;

(d) applying said special rendering routine to said size and position states of said on-screen objects where required;

(F) animating on the display means the on-screen objects in their intermediate size and position states; and (G) displaying on a display means the on-screen objects in their final size and position states according to said data structure.

2. The method of interfacing with a user of claim 1, wherein said data structures include scale and node connection information for each object, a maximum scale factor, an intermediate scale factor, a minimum scale factor, and a decay factor step, wherein (a) further comprises:

(1) assigning said maximum scale factor to any on-screen object which has the current root node;

(2) assigning said intermediate scale factor to any on-screen object directly attached to the object which has the current root node; and (3) assigning said minimum scale factor to any on-screen object which is not attached to the object which has the current root node.

3. The method of interfacing with a user of claim 1, wherein said data structures include scale information for each object, a maximum scale factor, a minimum scale factor and a decay factor step, wherein (a) further comprises:

(1) retrieving data tree, layout and sizing information including said maximum scale factor, said minimum scale factor and said decay factor;

(2) if the on-screen object has children, then going down one level to fetch a child object and repeating until an on-screen object is found that has no children of its own;

(3) setting the scale of the on-screen object to said maximum scale factor;

(4) calculating a tree distance for each on-screen object by counting the number of edges crossed between the selected object and each other object;

(5) if the tree distance for an on-screen object is less than the decay factor, then the calculating a scale factor for the object equal to 1 minus the ratio of the tree distance divided by the decay factor;

(6) else, setting the scale factor equal to said minimum scale;

(7) fetching the next child in the same level;

(8) repeating steps (3)–(7) until all children in the same level are processed;

(9) going up one level and fetching the next parent object;

(10) repeating steps (3)–(9) until all parent objects are processed;

(11) fetching the next object; and

(12) repeating steps (2)–(11) until all on-screen objects have been processed.

4. The method of interfacing with a user of claim 1, wherein data structures include a distance factor, and a layout style, wherein step (b) further comprises:

(1) retrieving size and layout information including said distance factor, and said layout style;

(2) locating the lowest level children of the on-screen object;

(3) calculating an x and y coordinate position for said on-screen object;

(4) repeating step (3) for all on-screen objects of a level;

(5) going up one level, and repeating steps 3 and 4 for all parents at that level;

(6) repeating steps 3 through 5 for all parents; and (7) fetching the next on-screen object and repeating steps 2 through 6 until all on-screen objects have been processed.

5. The method of interfacing graphically with a user of claim 1, wherein said data structures include the number of animation steps, initial and final size and position information, a frame acceleration model and the time delay between steps, wherein step (F) further comprises:

(a) retrieving the number of animation steps, the time delay and the frame acceleration model;

(b) calculating a time increment value to be added to a time value t, from said number of animation steps and said frame acceleration model;

(c) incrementing the time value t;

(d) calculating intermediate position and size states for all on-screen objects;

(e) rendering the intermediate size and position states of all on-screen objects as an intermediate animation frame;

(f) delaying for sufficient time that a user can perceive said intermediate animation frame; and (g) repeating steps (c)–(e) until the time value t has reached a predetermined value, and all intermediate animation frames have been displayed.

6. The method of interfacing graphically with a user of claim 5, wherein said frame acceleration model is a slow-in, slow-out model.

7. An apparatus for visually displaying information objects on a computer display screen comprising:

means for displaying;

at least one data tree;

a layout object;

a sizing object;

a plurality of on-screen objects;

means for selecting an on-screen object of interest;

size and positioning means which uses information from said data trees, said layout object, and said sizing object to provide said plurality of on-screen objects with final size and position state information;

means for animating, which determines intermediate size and position state information of said on-screen objects as they are moved from their initial size and position to their final size and position where the means for animating includes means for calculating final size states of all on-screen objects, means for calculating final position of all on-screen objects and means for calculating incremental intermediate frame state information; and means for rendering, which displays said on-screen objects in initial, intermediate and final size and position states on said display means.

* * * * *